Feb. 23, 1965  H. D. HOWELL, JR  3,170,775
CLINKER COOLER AND STATIONARY GRATE PLATES THEREFOR
Filed April 15, 1963

INVENTOR
HARRY D. HOWELL, JR.
BY
ATTORNEY

United States Patent Office 3,170,775
Patented Feb. 23, 1965

3,170,775
CLINKER COOLER AND STATIONARY GRATE
PLATES THEREFOR
Harry D. Howell, Jr., Redlands, Calif., assignor to Hanford Foundry Co., San Bernardino, Calif., a corporation of California
Filed Apr. 15, 1963, Ser. No. 272,963
6 Claims. (Cl. 34—164)

This invention relates to grate type air coolers for cement clinker and the like, and in particular to the initial stationary grate plates upon which the hot clinker falls after discharge from the rotary kiln.

Moving grate type clinker coolers are quite commonly employed for cooling cement clinker discharged from a rotary kiln at temperatures of about 2800° F., to a temperature of about 100° F. and for simultaneously preheating air for combustion purposes. These grate coolers, which are enclosed in an elongated refractory housing, are provided with a grate structure consisting of overlapping rows (disposed across the cooler) of perforated steel grate plate units, alternate rows of which are reciprocated, longitudinally of the housing, in a manner to convey the clinker from the entrance end to the discharge end. Air is blown under the grate structure and discharged upwardly through the bed of clinkers through the spaces between the grate plates, as well as through holes which are provided through the plates. At the entrance end of the cooler, the very hot clinker falls upon the first row of grate plates, which is stationary, and because of the high temperature and the mechanical erosion by the clinker, this first row of plates is often the cause for shut-downs of the plant. It will be understood that the shut-down of the very large equipment systems involved in modern Portland cement making entails much expense in repair and lost capacity, and that the lengthening of the life of the first row of cooler grate plates is important in this industrial operation.

The principal object of this invention is to provide improved stationary grate plates for receiving hot cement clinker in a grate cooler. Another object is to provide grate cooler plates for receiving and initially cooling hot cement clinker, in which upright retainer walls continuously hold back a cooled mass of cement clinker pieces. A further object is to provide a method and means to hold back a bed of partly cooled cement clinker on the first stationary row of grate cooler plates which bed receives the initial impact of the hot clinker discharged from the kiln.

These and other objects are attained by my retention grate plate invention, which will be understood from the following description, reference being made to the accompanying drawings in which FIG. 1 is a fragmentary side elevational view partly in section showing a portion of a grate type cement clinker cooler;

Figure 1:
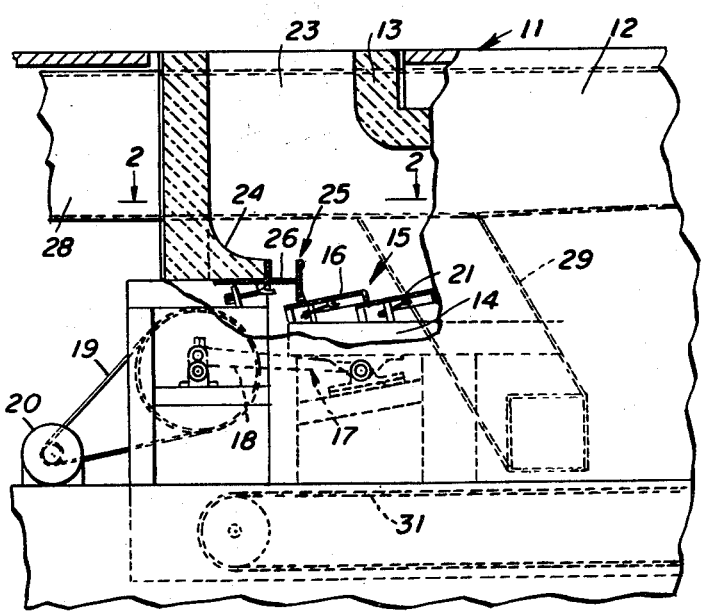
Figure 4:
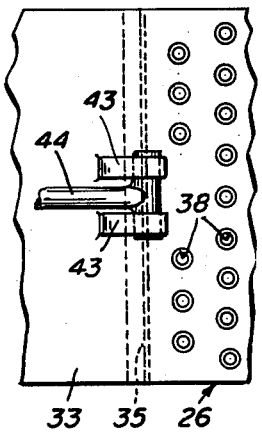
FIG. 4 is a bottom plan view taken from the position 4—4 of FIG. 3.
Figure 2:
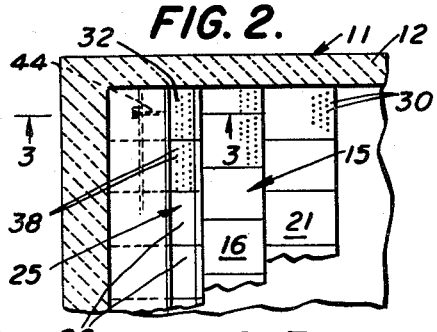
FIG. 2 is a vertical sectional view taken on the line 2—2 of FIG. 1.
Figure 5:
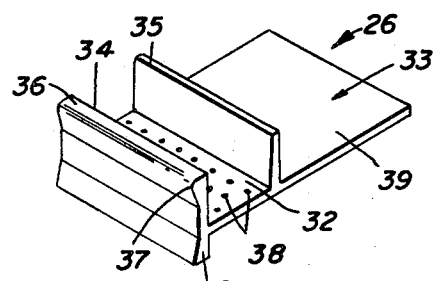
FIG. 5 is a perspective view showing a retention grate member.
Figure 3:
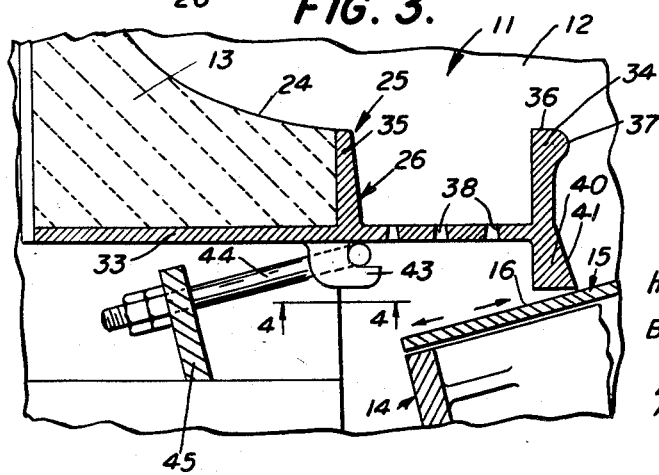
FIG. 3 is an enlarged cross-sectional view taken on the line 3—3 of FIG. 2.

Referring to the drawings, a typical grate type cooler for cement clinker is represented generally at 11, and consists essentially of a rectangular housing 12 which is lined with a refractory lining and is provided with horizontal grate supports 14 extending lengthwise of the furnace along opposite sides. The grate structure itself consists of overlapping rows of perforated grate plates 15, the rows extending across the cooler. The movable rows 16 of grate plates are each operatively connected to lever means 17 which in turn is operated by the crank arm 18 which is driven by the chain belt 19 driven by the motor 20. The movement of the plates is in the direction to alternately push the material on the plates of one row forwardly and on to the plates of the next row of plates 21. Cooling air is introduced below the grate structure through the air ducts 28 and 29 and passes upwardly through the openings between the grate plates and through the perforations 30 which are provided in all of the grate plates. The cooling air passes through the layer of clinker on the plates as it is progressively moved from the entrance end to the discharge end. A belt conveyor means 31 collects the fine cement clinker which falls through the openings in the grate plates and carries it to the discharge end of the cooler. The throat 23 of the cooler receives the discharge from a rotary cement kiln (not shown), the discharge consisting of very hot cement clinker material which drops into the throat of the cooler and falls on to a sloping ceramic structure 24 and also on to the row 25 of retention grate plates 26 which is the particular subject of this invention.

Each of the retention grate plates 26 consists of a rectangular base plate 33 which is provided with perpendicular retainer plates 34 and 35. The rearward retainer plate 35 extends upwardly from the base plate 33 at an intermediate position lengthwise on the base plate. The forward retainer plate 34 extends upwardly from the downstream edge of the base plate 33 and is provided with an upper edge 36 which is provided on its forward face with a rounded thickened discharge lip 37. Air openings 38 for the introduction of cooling air are provided in the portion 32 of the rectangular base plate 33 which lies between the retainer plates. The remaining portion 39 of the retainer plate is not provided with air perforations because this blank portion is normally anchored in or under the sloping ceramic structure 24. The retention grate plates 26 are provided on the under face with T-bolt lugs 43 which engage the T-bolts 44, the bolts being also attached to an anchor bar 45 of the cooler base structure.

The forward retainer plate 34 may be extended downwardly below the base plate 33 to form an integral pusher lug 40 which is arranged to make sliding contact with the top surfaces of the plates of the movable row 16. The pusher lug 40 is preferably provided with a sloped nose 41 to more easily slide the clinker on the movable grate plates.

The grate plates are preferably made of high temperature, high chrome nickel alloy steel, and are manufactured as unitary castings, because in this form and composition they have long life under the conditions to which they are subjected.

In operation the hot clinker from the rotary kiln drops through the throat 23, a portion striking the sloping ceramic structure 24 and some also falls directly into the retention space between the retainer plates 34 and 35 of the retention grate plates 26. The clinker which falls on the ceramic structure 24 slides into or over the retention grate plate 26. Cooling air is constantly supplied through the perforations 38, and a residual amount of cooled clinker remains in this retention space. The overflow of clinker is discharged over the discharge lip 37, whose forward edge projects the clinker pieces forwardly, thus preventing overheating of the retainer plate 34 and the pusher lug 40, and increasing the life of the retention grate plates 26. The provision of the projecting lip 37 has been found to give increased life to the retention grate plates by as much as ten percent. In general, the cooled clinker pieces which are in the retention space receive the impact of the hot clinker and therefore there is less heating of the metallic plates and much less mechanical erosion in the first row of grates.

The provision of grate plats of the kind dscribed having a clinker retention space, in the initial row of a cement cooler grate structure, gives the advantages of a much longer life to the cooler and therefore permits the cement manufacturing system to go through much longer campaigns without a complete shut-down for replacement of the burned out initial row of grate plates. The provision of the forwardly projecting lip on the forward retainer plate also appreciably lengthens the life of the retention grate plates of this invention.

I claim:

1. An integral retention grate member for a grate type cooler for cement clinker comprising a rectangular base plate having an edge adapted to be positioned downstream of the other edges, retainer plates extending upwardly from the downstream edge and from an intermediate position on said base plate to form a deep pocket for retention of clinker, said base plate being perforated between said retainer plates, and anchoring means extending from said base plate.

2. An integral retention grate member for a grate type cooler for cement clinker comprising a rectangular base plate having an edge adapted to be positioned downstream of the other edges, retainer plates extending upwardly from the downstream edge and from an intermediate position on said base plate to form a deep pocket for retention of clinker, said base plate being perforated between said retainer plates, anchoring means extending from said base plate, and a pusher lug extending across and below said base plate adjacent the downstream edge thereof.

3. In a grate type cooler for hot cement clinker having a sequence of reciprocably movable and stationary rows of perforated grate plates which advance the clinker from the entrance to the exit end of said cooler and including means for blowing cooling air upwardly through the perforations of said plates, an initial entrance end row of stationary grate members characterized by having integral pocket means to retain a mass of clinker upon which the hot clinker from a cement kiln is received in said cooler, each of said stationary grate members with retention pocket means comprising a horizontally disposed base plate, retainer plates extending upwardly from the forward edge and from an intermediate position rearwardly on said base plate, the said base plate being perforated between said retainer plates and arranged to continuously receive cooling air from said blowing means, and means for anchoring said base plate so that each of said retention pocket stationary grate members remain superimposed at least partly over a corresponding movable grate plate in the first succeeding row of movable grate plates, and is adapted to push off the reposing clinker on said movable grate plate on its backward movement.

4. In a grate type cooler for hot cement clinker having a sequence of reciprocably movable and stationary rows of perforated grate plates which advance the clinker from the entrance to the exit end of said cooler and including means for blowing cooling air upwardly through the perforations of said plates, an initial entrance end row of stationary grate members characterized by having integral pocket means to retain a mass of clinker upon which the hot clinker from a cement kiln is received in said cooler, each of said stationary grate members with retention pocket means comprising a horizontally disposed base plate, retainer plates extending upwardly from the forward edge and from an intermediate position rearwardly on said base plate, the said base plate being perforated between said retainer plates and arranged to continuously receive cooling air from said blowing means, and means for anchoring said base plate so that each of said retention pocket stationary grate members remain superimposed at least partly over a corresponding movable grate plate in the first succeeding row of movable grate plates; said base plate also having a pusher lug extending across and below said plate adjacent the forward edge thereof and adapted to make surface contact with the corresponding movable grate plate, said pusher lug being adapted to push off the reposing clinker on said movable grate plate on its backward movement.

5. A retention grate member for a grate type cooler for cement clinker comprising a rectangular base plate having an edge adapted to be positioned downstream of the other edges, retainer plates extending upwardly from the downstream edge and from an intermediate position on said base plate, said base plate being perforated between said retainer plates, and anchoring means extending from said base plate, the downstream retainer plate being provided with a forwardly projecting lip.

6. A retention grate member for a grate type cooler for cement clinker comprising a rectangular base plate having an edge adapted to be positioned downstream of the other edges, retainer plates extending upwardly from the downstream edge and from an intermediate position on said base plate, said base plate being perforated between said retainer plates, anchoring means extending from said base plate, and a pusher lug extending across and below said base plate adjacent the forward edge thereof, the downstream retainer plate being provided with a forwardly projecting lip.

References Cited by the Examiner

UNITED STATES PATENTS

| | | | |
|---|---|---|---|
| 1,753,220 | 4/30 | Stanbery et al. | 263—6 |
| 2,431,799 | 12/47 | Gaffney | 34—164 |

OTHER REFERENCES

Pages 274, 275, and 276 of Industrial Furnaces, vol. I, Fourth Edition, 1951, by W. Trinks. Published by John Wiley and Sons, New York, N.Y.

CHARLES SUKALO, *Primary Examiner.*

JOHN J. CAMBY, *Examiner.*